US008230760B1

(12) United States Patent
Breeding

(10) Patent No.: US 8,230,760 B1
(45) Date of Patent: Jul. 31, 2012

(54) CONCRETE VIBRATOR INLINE TRANSMISSION

(75) Inventor: Kenny D Breeding, Little Rock, AR (US)

(73) Assignee: Wacker Neuson Production Americas LLC, Menomonee Falls, WI (US)

( * ) Notice: Subject to any disclaimer, the term of this patent is extended or adjusted under 35 U.S.C. 154(b) by 564 days.

(21) Appl. No.: 12/423,731

(22) Filed: Apr. 14, 2009

(51) Int. Cl.

| | |
|---|---|
| ***F16H 33/00*** | (2006.01) |
| ***F16H 35/00*** | (2006.01) |
| ***F16H 37/00*** | (2006.01) |
| ***B01F 11/00*** | (2006.01) |
| ***B28C 5/48*** | (2006.01) |

(52) U.S. Cl. .......................................... 74/640; 366/108

(58) Field of Classification Search .............. 74/61, 640; 366/108–128
See application file for complete search history.

(56) References Cited

U.S. PATENT DOCUMENTS

| | | | | |
|---|---|---|---|---|
| 2,678,195 | A * | 5/1954 | Hunter et al. | 74/87 |
| 2,750,160 | A * | 6/1956 | Englund et al. | 74/87 |
| 3,173,300 | A * | 3/1965 | Loveless | 74/61 |
| 3,286,991 | A * | 11/1966 | Pellegatti | 366/123 |
| 3,340,742 | A * | 9/1967 | Chandler | 74/87 |
| 3,447,398 | A * | 6/1969 | Sheng | 475/255 |
| 6,543,926 | B2 * | 4/2003 | Sherez | 366/108 |

* cited by examiner

*Primary Examiner* — Tisha Lewis
(74) *Attorney, Agent, or Firm* — Boyle Fredrickson, S.C.

(57) ABSTRACT

The present concrete vibrator inline transmission is a unique combination of gears that changes the speed of a primary power source so that a remote concrete tool runs at a speed different than that of the primary power source. This unique apparatus allows for unique methods of using the concrete vibrator inline transmission.

8 Claims, 18 Drawing Sheets

CONCRETE VIBRATOR INLINE TRANSMISSION

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

1. Field of the Invention

This invention relates to the field of concrete vibrators for processing wet concrete.

2. Description of the Prior Art

Concrete vibrators are offered in a variety of combinations. Some of the offerings are described in the patents, while others are simply commercially available.

While the patented and commercially available devices fulfill there respective and particular objects and requirements, they do not describe a concrete vibrator that provides the advantages of the present invention as described later herein.

SUMMARY OF THE INVENTION

In one exemplary embodiment, a concrete vibrator inline transmission including at least a base; a base bearing support formed in the base and defining an input axis; an input shaft positioned in the base bearing support and coaxial to the input axis; an input gear fixedly interfaced with the input shaft and coaxial to the input axis; a cap fixedly attached to the base; a cap bearing support formed in the cap and defining an output axis; wherein the input axis and the output axis are coaxial; an output shaft positioned in the cap bearing support and coaxial to the output axis; an output gear fixedly interfaced with the output shaft and coaxial to the output axis; and, a branch transmission gearingly disposed engaged to the input gear and the output gear.

In another exemplary embodiment disclosed herein, a method of making a concrete vibrator inline transmission including at least providing a base comprising a base bearing support formed in the base and defining an input axis; providing an input shaft; positioning the input shaft in the base bearing support coaxial to the input axis; interfacing the input gear with the input shaft; providing a cap comprising a cap bearing support formed in the cap and defining an output axis that is coaxial to the input axis; providing an output shaft; positioning the output shaft in the cap bearing support coaxial to the output axis; providing an output gear; interfacing the output gear with the output shaft and coaxial to the output axis; providing at least one branch assembly; interfacing the at least one branch assembly with the input gear; and, after the positioning the input shaft, the interfacing the input gear, the positioning the output shaft, the interfacing the output gear, and interfacing the at least one branch assembly, attaching the cap to the base.

In another exemplary embodiment disclosed herein, a method of using a concrete vibrator inline transmission including at least providing the concrete vibrator inline transmission comprising: a base; a cap attached to the base; a gear train disposed between the base and the cap, the gear train defining an input and an output; a remote finishing tool drivingly engaged to the output; a primary power source drivingly engaged to the input; starting the primary power source at a first rotation speed; and, positioning the remote finishing tool in wet concrete while the remote finishing tool is being driven at a second rotation speed that is not equal to the first rotation speed.

BRIEF DESCRIPTION OF THE DRAWINGS

The following Figures of the Drawing show one exemplary embodiment of the present concrete vibrator inline transmission.

DETAILED DESCRIPTION

Figure 1:
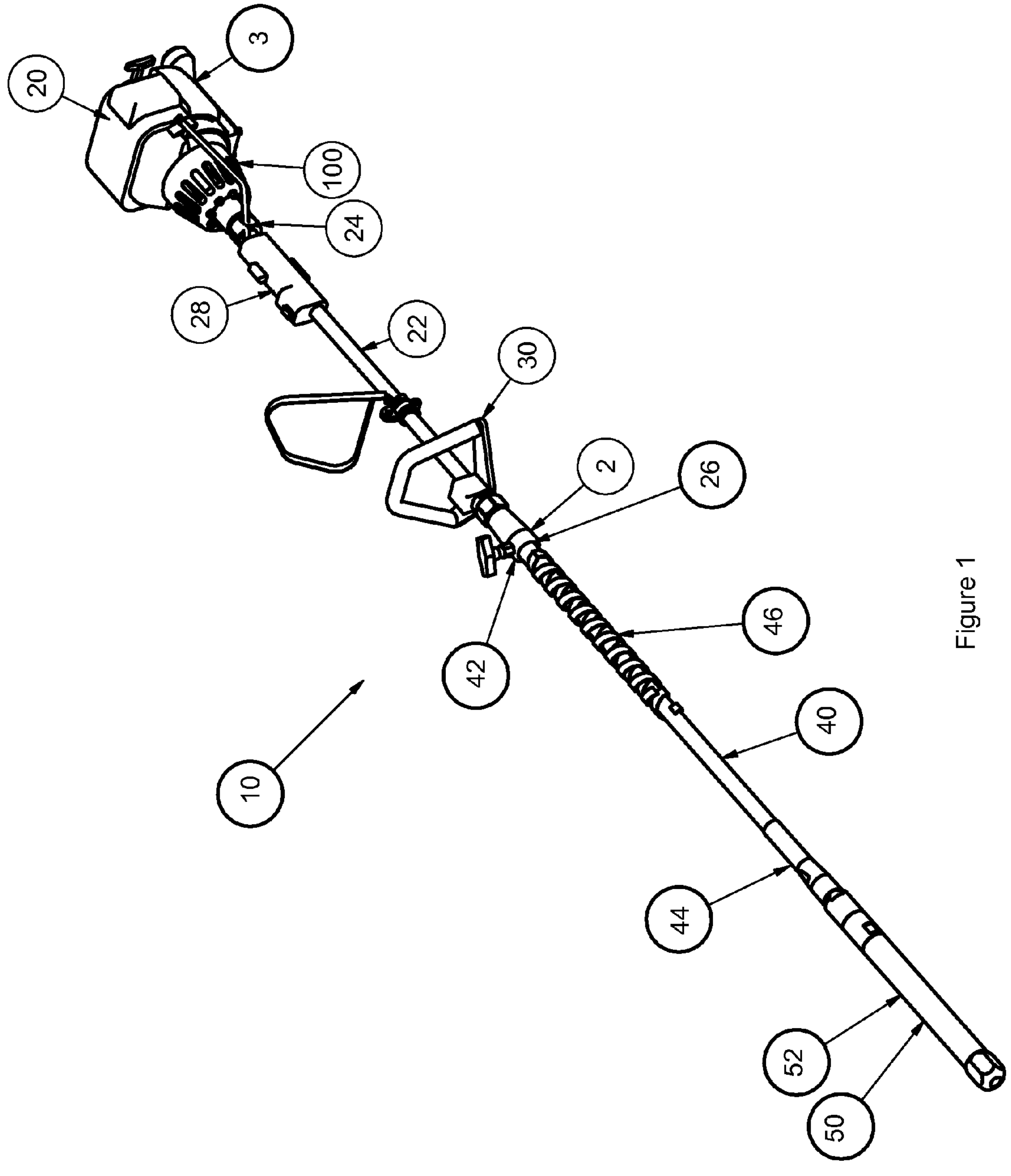
FIG. 1 shows an isometric perspective of a portable concrete vibrator with an inline transmission.

FIG. 1 shows an isometric perspective of a portable concrete vibrator system 10. The concrete vibrator system 10 is used primarily to consolidate fresh concrete so that entrapped air and excess water are released and the concrete settles firmly in place in the forms. Improper consolidation of concrete can cause product defects, compromise the concrete strength, and produce surface blemishes.

With continued reference to FIG. 1, the portable concrete vibrator system 10 includes a primary power source 20. There are many varieties of the primary power source 20 such as, for example, an electric motor, a hydraulic motor, a pneumatic motor, a two-stroke engine, and as illustrated, a four-stroke engine. When configured with a four-stroke engine, the engine is typically in the range of 25 cc to 50 cc in displacement which net a couple of horsepower. In one particular embodiment, a Honda® Power Equipment Corp. 25 cc mini four-stroke OHC engine model GX35 has proven to be an acceptable primary power source 20. This particular engine has a net horsepower output of 1.3 at 7,000 revolutions per minute (RPM). An additional specification of the GX35 is that it produces a net torque of 1.2 lbs-ft at 5,500 RPM. Therefore, the engine must be operated at a high rotation speed so that the torque is high enough to cause proper consolidation of the fresh concrete.

The portable concrete vibrator 10 is also provided with an inline transmission 100 that is the essence of the present application and will be described in greater detail later herein. This inline transmission 100 is physically attached to the primary power source to receive power generated by the primary power source 20. The portable concrete vibrator system 10 is also provided with an elongated tubular member 22 defining a first distal end 24 and an opposite second distal end 26. The elongated tubular member 22 is provided with a trigger handle 28 and a support handle 30 attached to the first and second distal ends 24, 26, respectively. The elongated tubular member first distal end 24 is physically attached to the inline transmission 100. Additionally, the elongated tubular member 22 is provided with a rigid driveshaft (not shown) located in the inside thereof. This rigid driveshaft is capable of receiving the power generated by the primary source via the inline transmission 100. The power that is received by the rigid driveshaft is transferred from the elongated tubular member first distal end 24 to the second distal end 26.

With continued reference to FIG. 1, the portable concrete vibrator 100 is also provided with a flexible tubular member 40 defining a first distal end 42 and an oppositely disposed second distal end 44. The flexible tubular member 40 in an assembly of a variety of components such as, but not limited to, a flexible sheath 46 housing a flexible driveshaft (not shown) located inside thereof.

Figure 2:
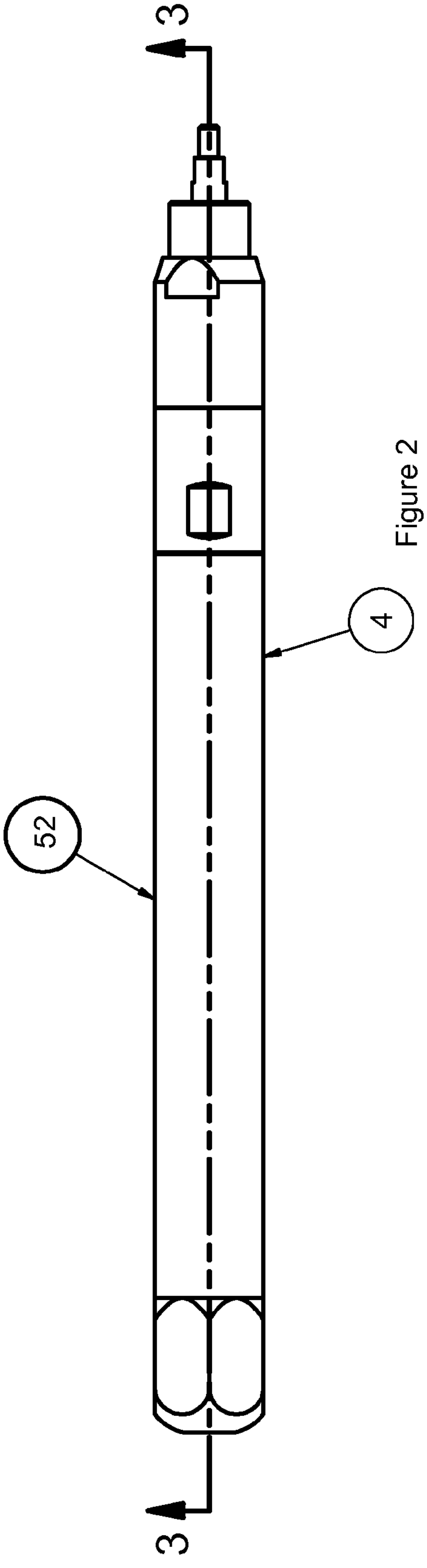
FIG. 2 shows a pendulous vibrator remote finishing tool.
Figure 3:
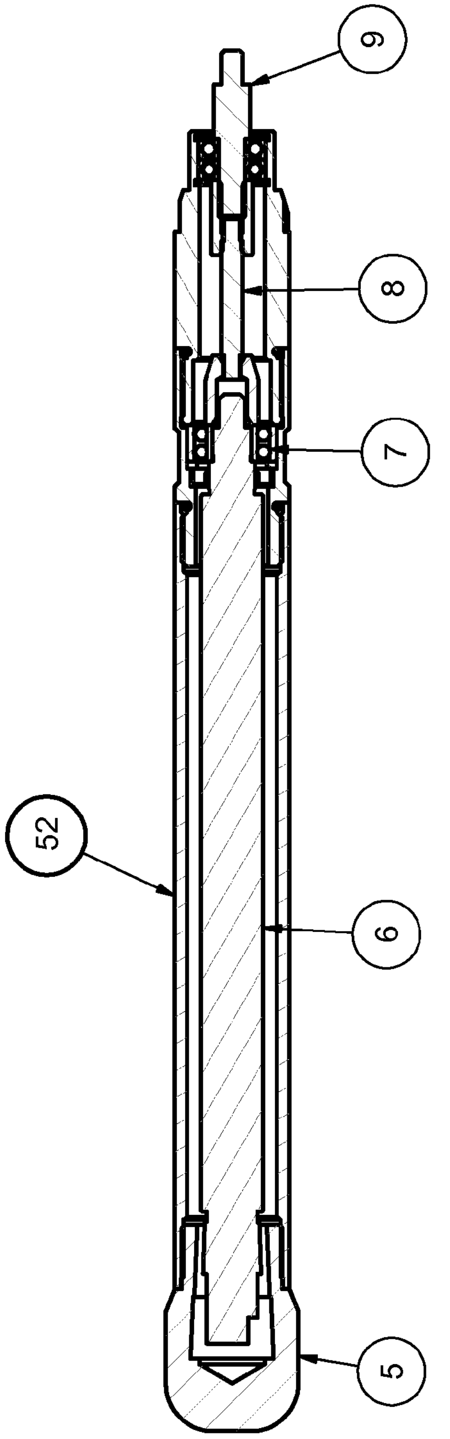
FIG. 3 shows the pendulous vibrator remote finishing tool of FIG. 2 taken across plane 3-3 illustrated in FIG. 2.
Figure 4:
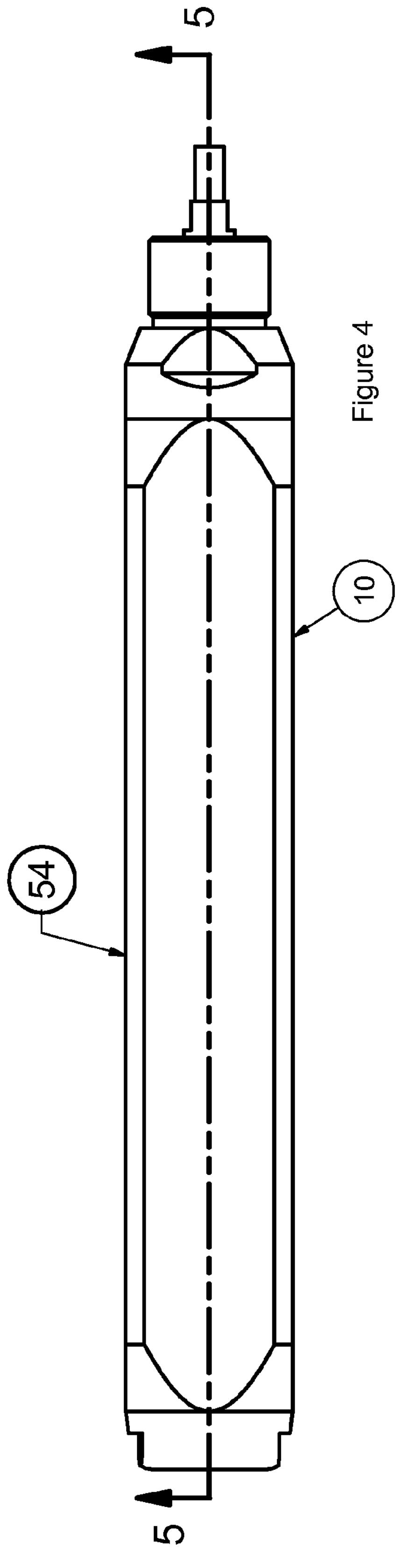
FIG. 4 shows a flexible shaft vibrator remote finishing tool.
Figure 5:
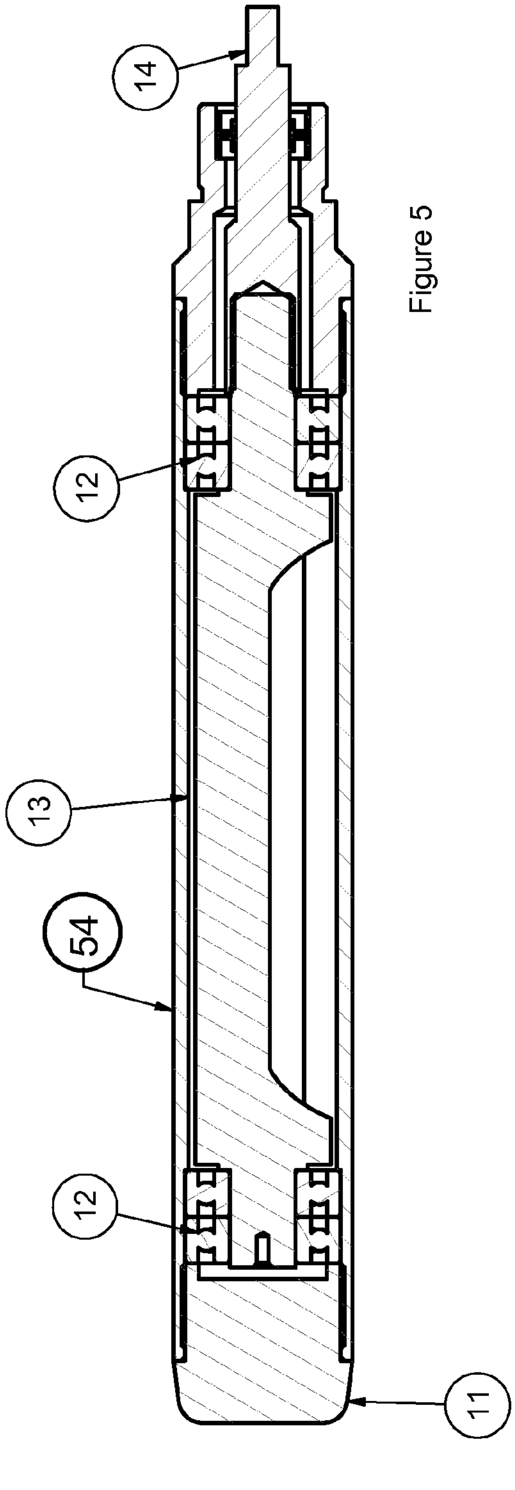
FIG. 5 shows the flexible shaft vibrator remote finishing tool of FIG. 4 taken across plane 5-5 illustrated in FIG. 4.

One of the key components of the concrete vibrator system 10 is a remote finishing tool 50. There are many types of remote finishing tools such as a pendulous vibrator 52 illustrated in FIGS. 1, 2 and 3 and a flexible shaft vibrator 54 illustrated in FIGS. 4 and 5. Although many types of these finishing tools are commercially available, various configurations of the pendulous vibrator 52 are described in U.S. Pat. No. 6,065,859 titled PORTABLE PENDULOUS CONCRETE VIBRATOR issued to Kenny D. Breeding on May 23, 2000 are specifically identified as a style of remote finishing tool well suited for the present invention. Therefore, U.S. Pat. No. 6,065,859 issued to Kenny D. Breeding on May 23, 2000 is specifically incorporated by reference for all that is disclosed therein. In general, the remote finishing tool 50 is immersed in wet concrete and used to release any entrapped air and excess water in a manner well-known in the industry. The remote finishing tool 50 is attached to the flexible tubular member 40 such that it receives the power generate by the primary power source 20 via the elongated tubular member 22 and the flexible tubular member 40. This power is used to create a vibration which allows the power to be transferred to the concrete in which the remote finishing tool 50 is placed.

Having provided a generalized overall layout of one exemplary concrete vibrator system 10, elements of one exemplary inline transmission 100 and assemblage thereof will be described. It is important to point out that this exemplary inline transmission 100 is provided for illustrative purposes only and minor alteration or entirely different embodiments may be constructed but within the scope of the claims that ultimately issue from this present application.

Figure 6:
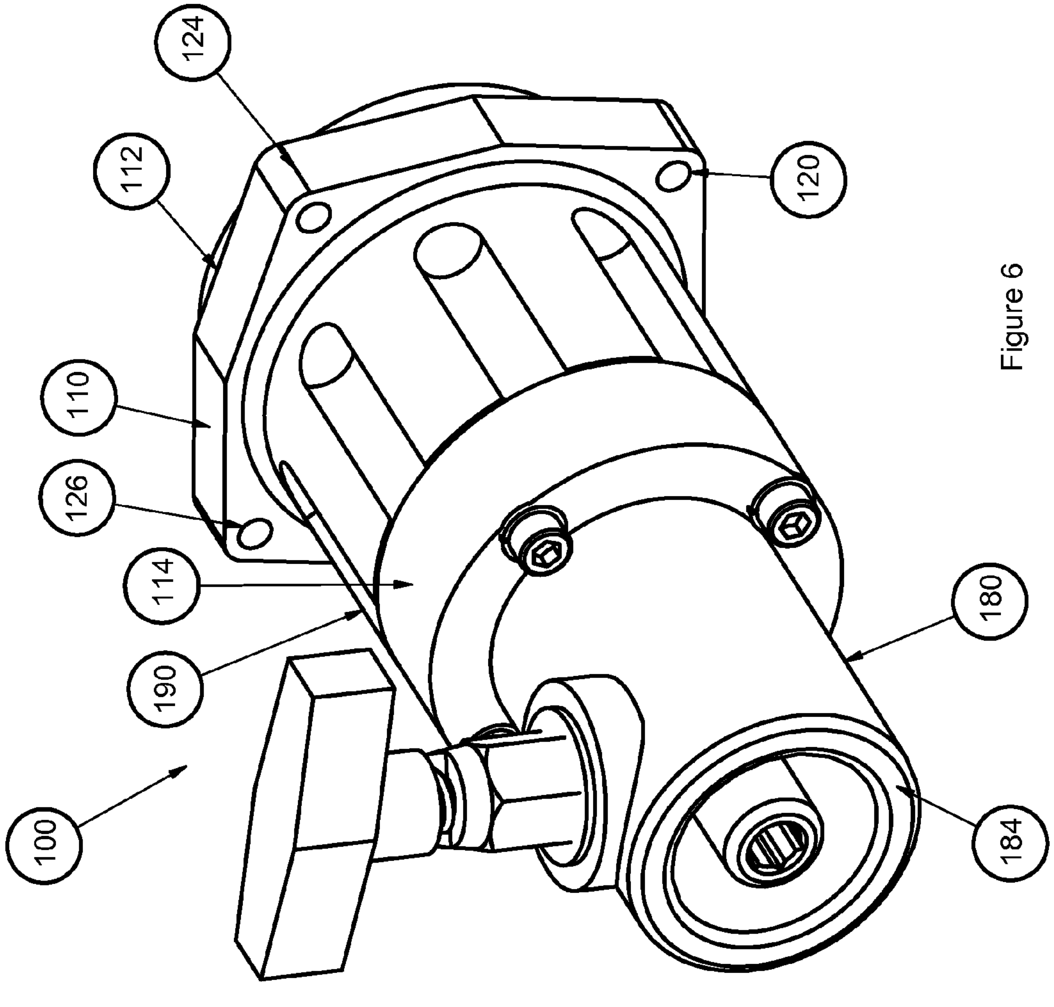
FIG. 6 shows an isometric perspective view of an exemplary inline transmission.
Figure 7:
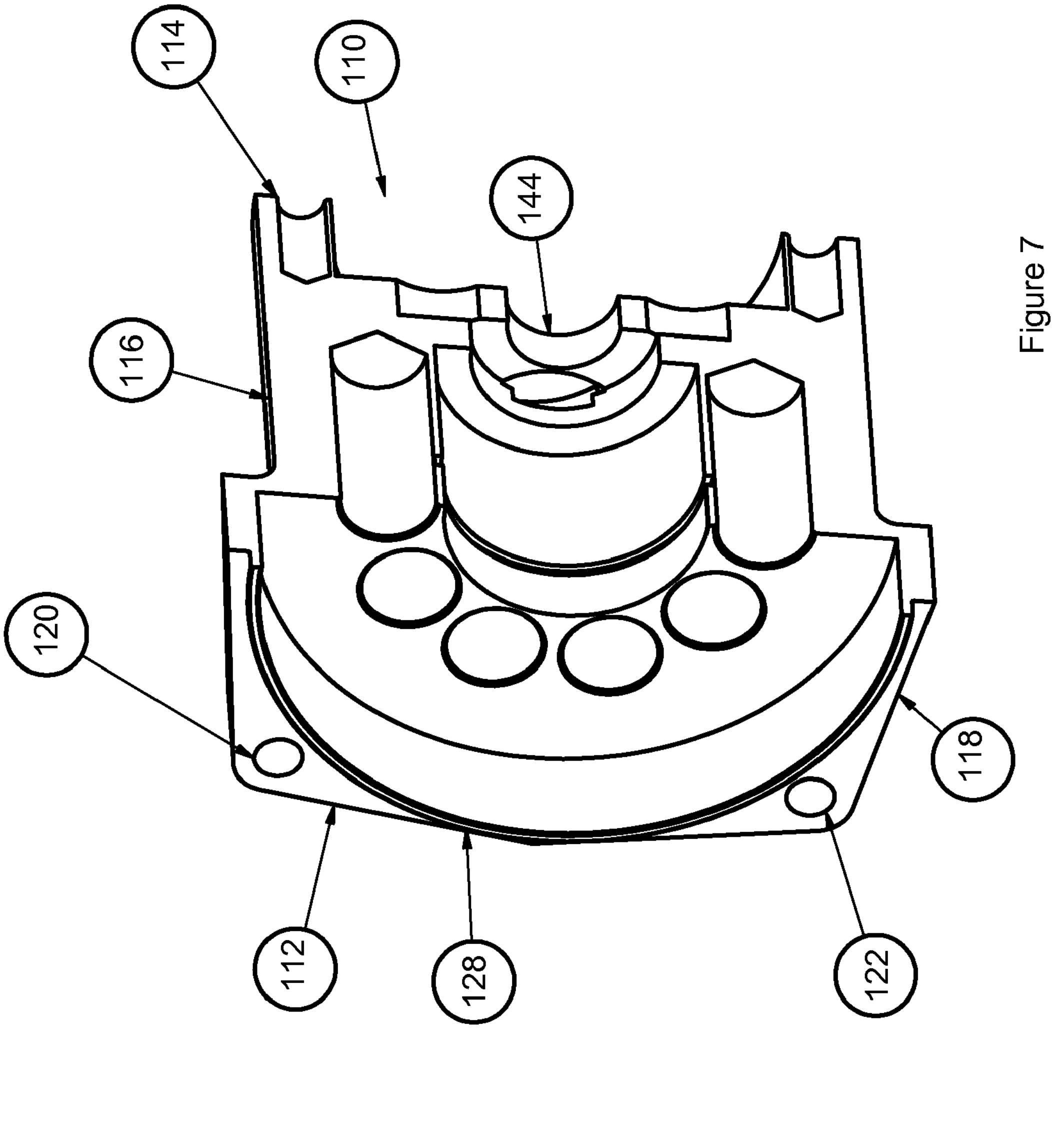
FIG. 7 shows a cross-sectional view taken across a center plane of a base of the inline transmission of FIG. 6.

With reference to FIG. 6 showing an isometric perspective view of the inline transmission 100, the inline transmission 100 includes a base 110 and a cap 180. The base 110 generally defines a cylindrical body having a first end 112 and an oppositely disposed second end 114 separated by a cylindrical wall 116. With reference to FIG. 7 showing a cross-sectional view the inline transmission base 110 taken across a center plane thereof, the base 110 has a locating bezel 118 formed in the first end 112. The base first end 112 also has a plurality of mounting holes 120, 122, 124 (FIG. 6), 126 (FIG. 6) formed in the main body of the base 110 as illustrated. The base first end 112 may also be formed with an extruded cut 128 that is concentric to the locating bezel 118. At the bottom of the extruded cut 128, a plurality of weight reduction holes 130 (e.g. 132, 134, 136) are formed evenly spaced in a pattern that is coaxial to the cylindrical wall 116. Also formed in at the bottom of the extruded cut 128 is a bearing support 140 with a groove 142 formed therein. There is also a through hole 144 formed between the bearing support 140 and the second end 114 as illustrated in FIG. 7.

Figure 8:
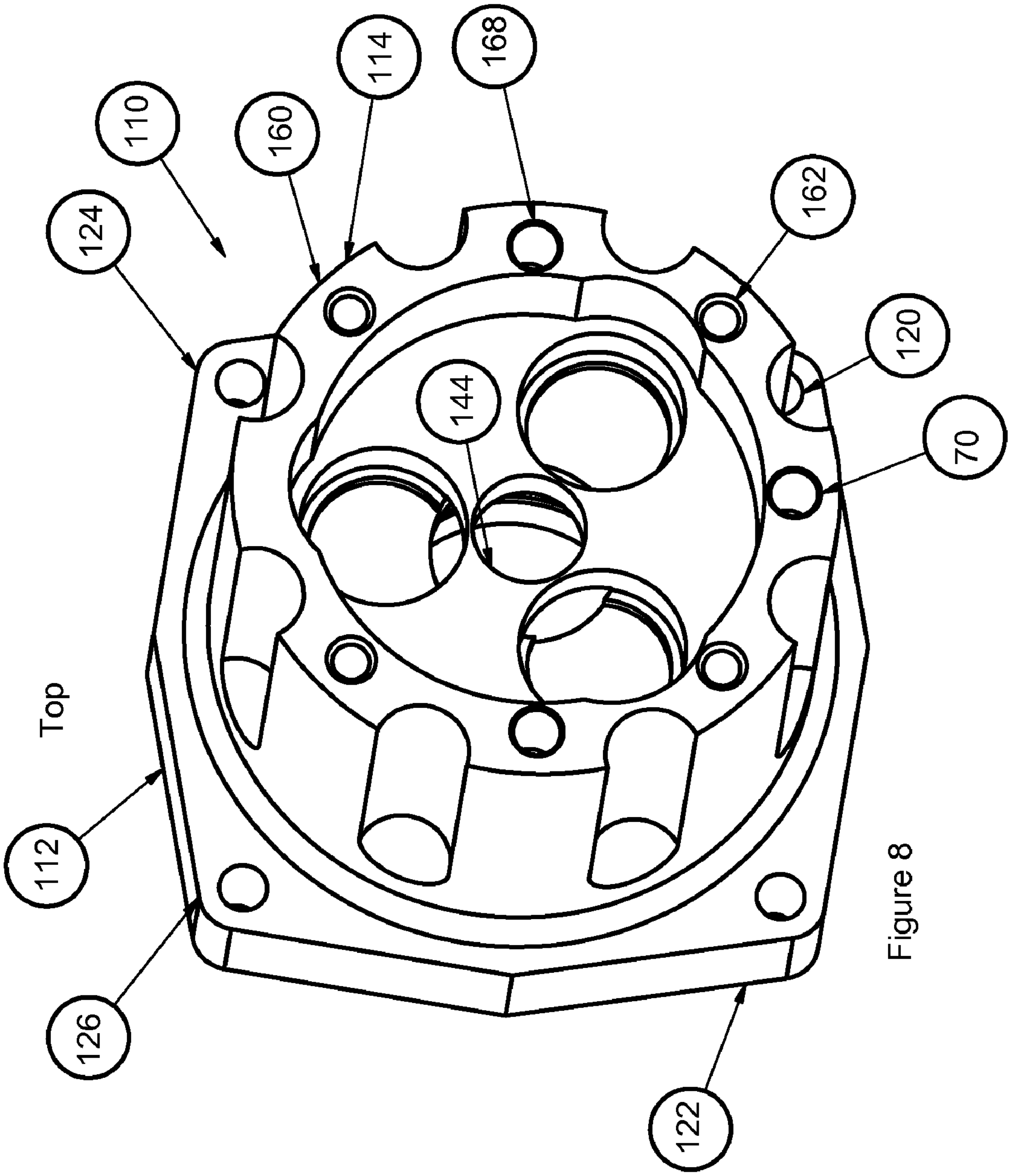
FIG. 8 shows an isometric view of the base of FIG. 7 from a second end.

With reference to FIG. 8 showing an isometric view of the base 110 from the second end 114, the base 110 may be provided with a cavity 150 formed in the base second end 114. This cavity 150 is concentric to the cylindrical wall 116. The base 110 may be provided with a plurality of branch bearing supports 152, 154, 156 arranged in a pattern that is coaxial to the bearing support 140 (FIG. 7). The base 110 may also be provided with a plurality of threaded holes 160, 162, 164, 166 formed in the second end 114. The base 110 may also be provided with a plurality of locator pin holes 168, 170, 172. As a further weight savings, the cylindrical wall 116 may have a plurality of axial cuts 174 formed in the cylindrical wall 116.

Figure 9:
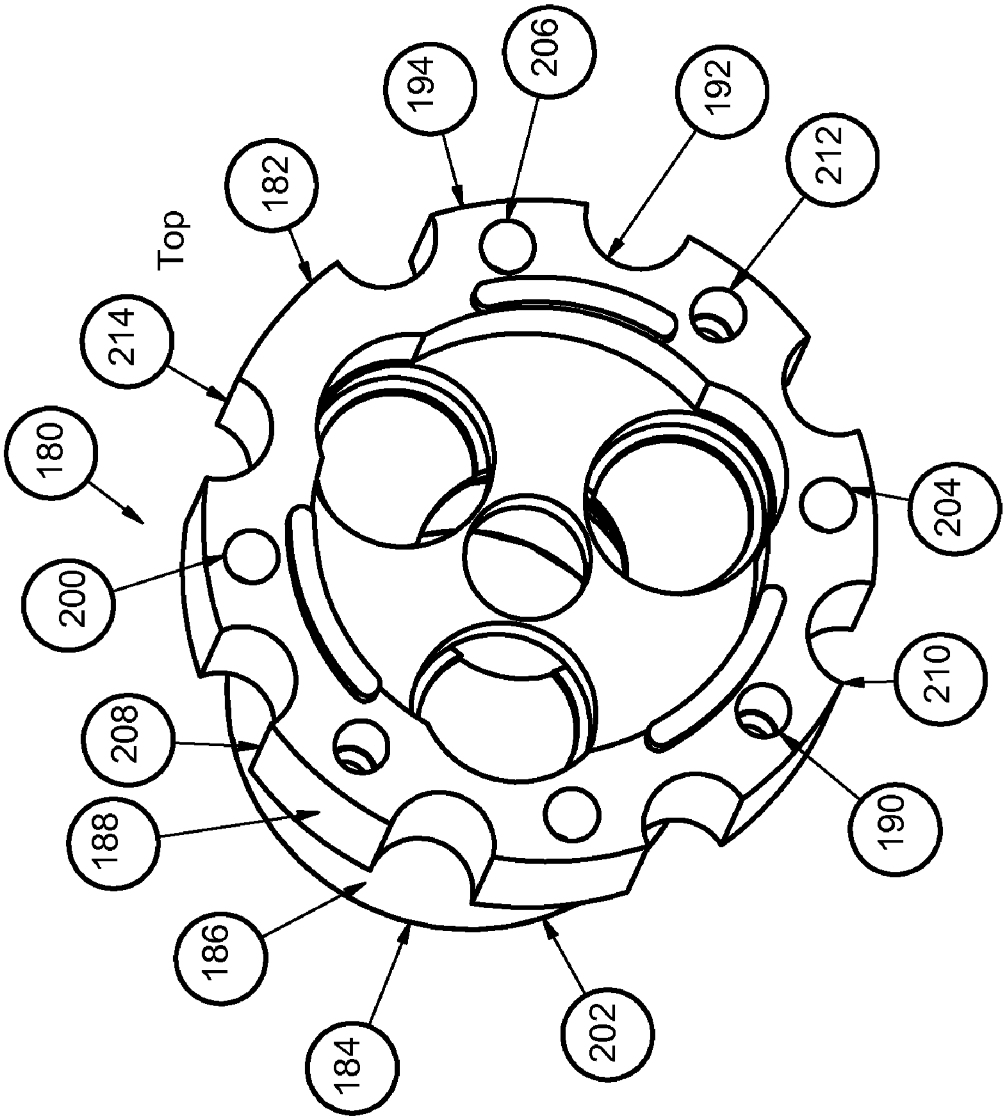
FIG. 9 shows a perspective view of a first end of a cap.

With reference again to FIG. 6, the inline transmission cap 180 defines a first end 182 and an oppositely disposed second end 184 separated by cylindrical walls 186, 188. The cylindrical walls 186, 188 are separated by a wall 190 that is perpendicular to the first and second ends 182, 184. With reference now to FIG. 9 showing a perspective view of the first end 182 of the inline transmission cap 180, the cap 180 is provided with a locating bezel 192 that is formed on the first end 182. The cap 180 is provided with a cavity 194 that is formed in the first end 182. The cap 180 may also be provided with a plurality of through holes 200, 202, 204, 206 formed in the second end 182. The cap 180 may also be provided with a plurality of locator pin holes 208, 210, 212. As a further weight savings, the cylindrical wall 188 may have a plurality of axial cuts 214 formed in the cylindrical wall 188. The cap 180 may be provided with a plurality of branch bearing supports 222, 224, 226 arranged in a pattern that is coaxial to the locating bezel 192 and formed in the bottom wall of the cavity 194.

Figure 10:
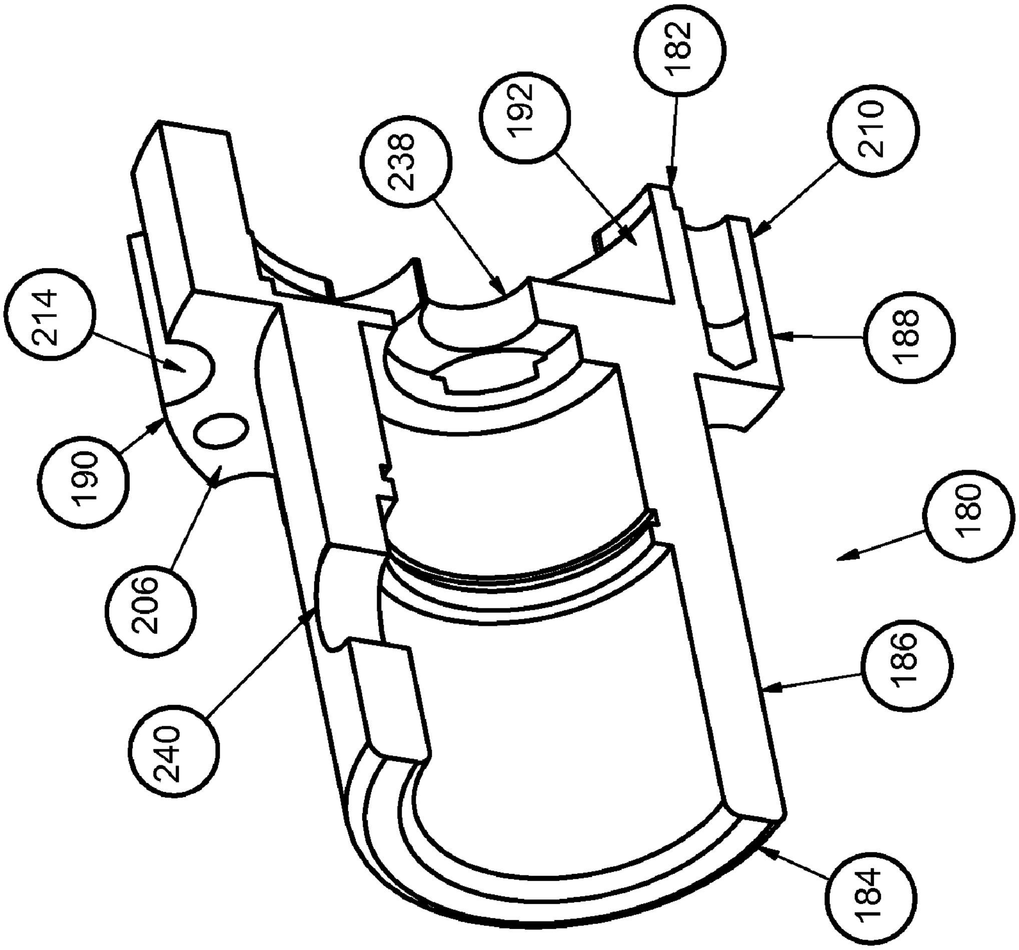
FIG. 10 shows a cross sectional view taken across a center plane of the cap of FIG. 9.

With reference to FIG. 10 showing a cross sectional view of the cap 180 taken across down a center plane thereof, the cap 180 is provided with a clearance hole 230 formed in the second end 184. At the bottom of the clearance hole 230, a bearing support 232 with a groove 236 formed therein is located coaxial to the clearance hole 230. At the bottom of the bearing support 232 is a through hole 238 formed between the bearing support 232 and the cavity 194. The cap 280 is also provided with a cross hole 240 formed in the cylindrical wall 186 such that it is substantially perpendicular to the bearing support 232.

Figure 11:
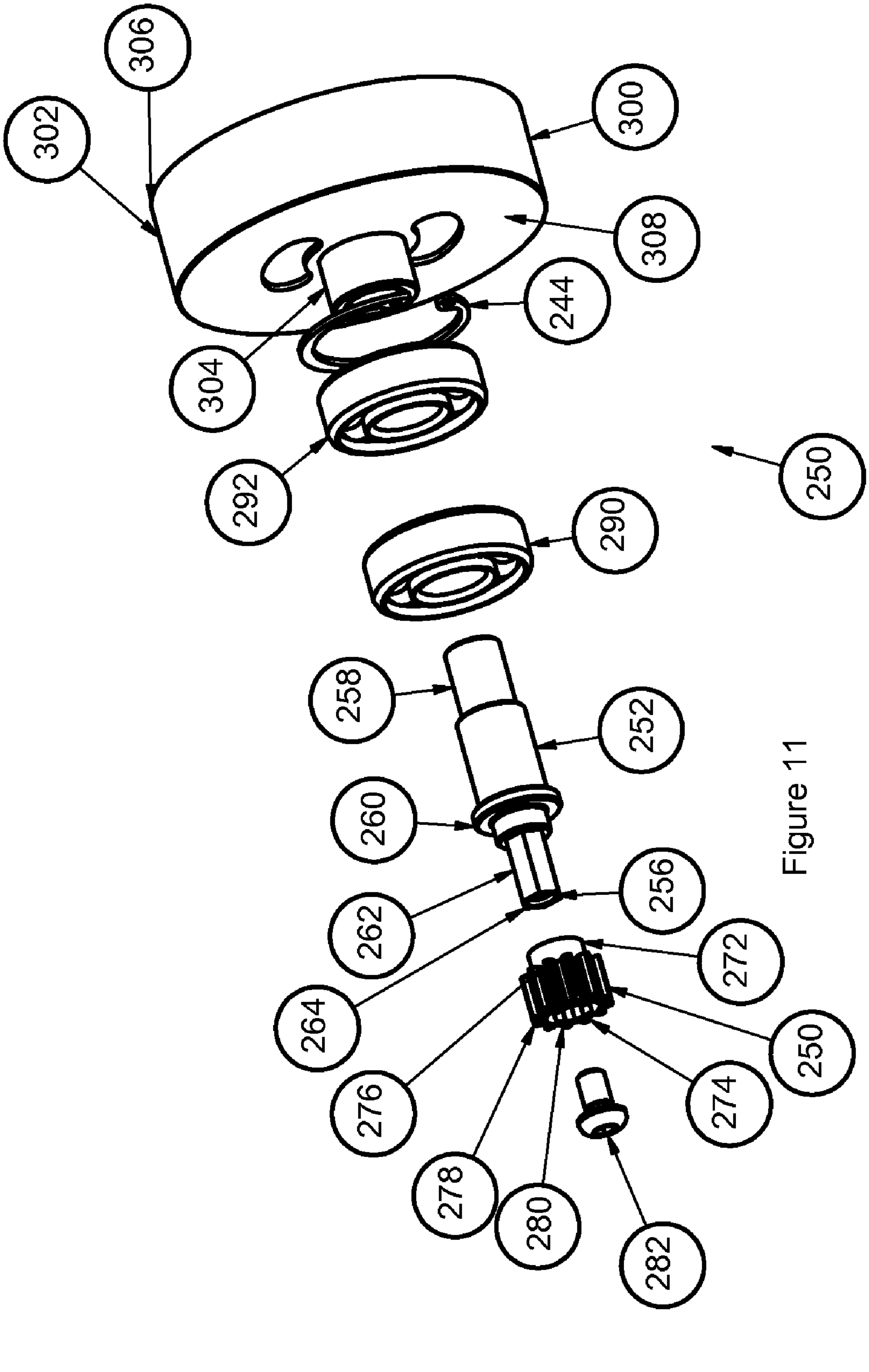
FIG. 11 shows components of an input subassembly in an exploded condition.

With reference to FIG. 11 showing components of an input subassembly 250 in an exploded condition, the input subassembly 250 may be provided with an input shaft 252 defining a first end 254 and an oppositely disposed second end 256. The first end 254 a reduction 258. The center of the input shaft 252 has a collar 260 and the second end 256 has a hexagonal portion 262 formed thereon. The second end 256 has blind threaded hole 264. The input assembly 250 is also provided with an input gear 270 defining a first end 272 and an oppositely disposed second end 274. The input gear 270 may be provided with a location shoulder 276 formed near the first end 272. The input gear 270 is provided with a plurality of gear teeth 278 located between the shoulder 276 and the second end 274. In one exemplary configuration, this input gear 270 is provided with a 12 individual teeth of the plurality of teeth 278 and this input gear 270 is made of various materials. The input gear 270 may be provided with a hexagonal through hole 280 formed down the center extending between the first and second ends 272, 274. The input assembly 250 is further provided with a button head screw 282 having a threaded body that matches the diameter and pitch of the blind threaded hole 264 of the input shaft 252. The input gear 270 is fixedly attached to the input shaft 252 by the button head screw 282. This assemblage of the input gear 270 onto the input shaft 252 may be replaced by employing a powdered metal manufacturing process, hobbing the plurality of teeth 278 directly into the input shaft 252, or other manufacturing processes commonly used to reduce part count.

Figure 12:
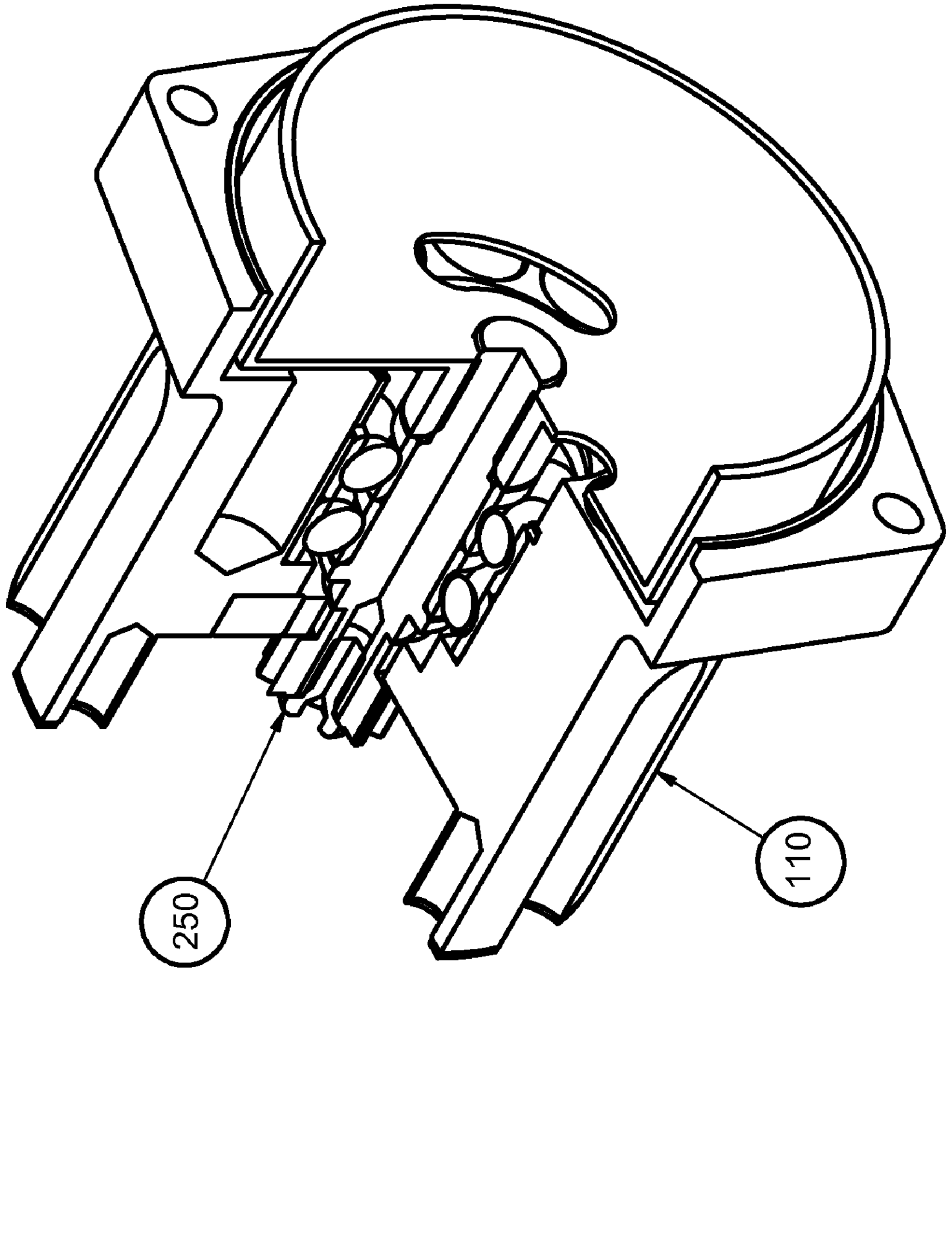
FIG. 12 shows a cross-sectioned view of the base of FIG. 7 and the input assembly 250 of FIG. 11.

With continued reference to FIG. 11, the input assembly 250 may be provided with a pair of bearings including a first bearing 290 and a second bearing 292. These bearings 290, 292 are positioned on the input shaft 252 such that the first bearing 290 contacts the collar 260 and the second bearing 292 contacts the first bearing 290. The input assembly 250 is also provided with an internal snap ring 294 that is only provided with the input assembly 250 and not actually engaged with anything until it is positioned and engaged with the groove 142 (FIG. 7) of the base 110 (FIG. 7). The input assembly 250 is also provided with a centrifugal clutch bell 300 defining a first end 302 and an oppositely disposed second end 304. The first end 302 is formed with a circumferential wall 306 and the second end 304 is formed with a hole 308. Once assembled, the hole 308 of the centrifugal clutch bell 300 is attached to the reduction 258 of the input shaft 252. Once the input assembly 250 is assembled with the various components, it is engaged with the base 110 as illustrated in FIG. 12 showing a cross-sectioned view of the base 110 and input assembly 250 subassembly. It is important to note that the order of assembling the base 110 and the input assembly 250 may be made out of order; for example, the input gear 270 may be installed on the input shaft 252 after the input assembly 250 is substantially unioned with the base 110.

Figure 13:
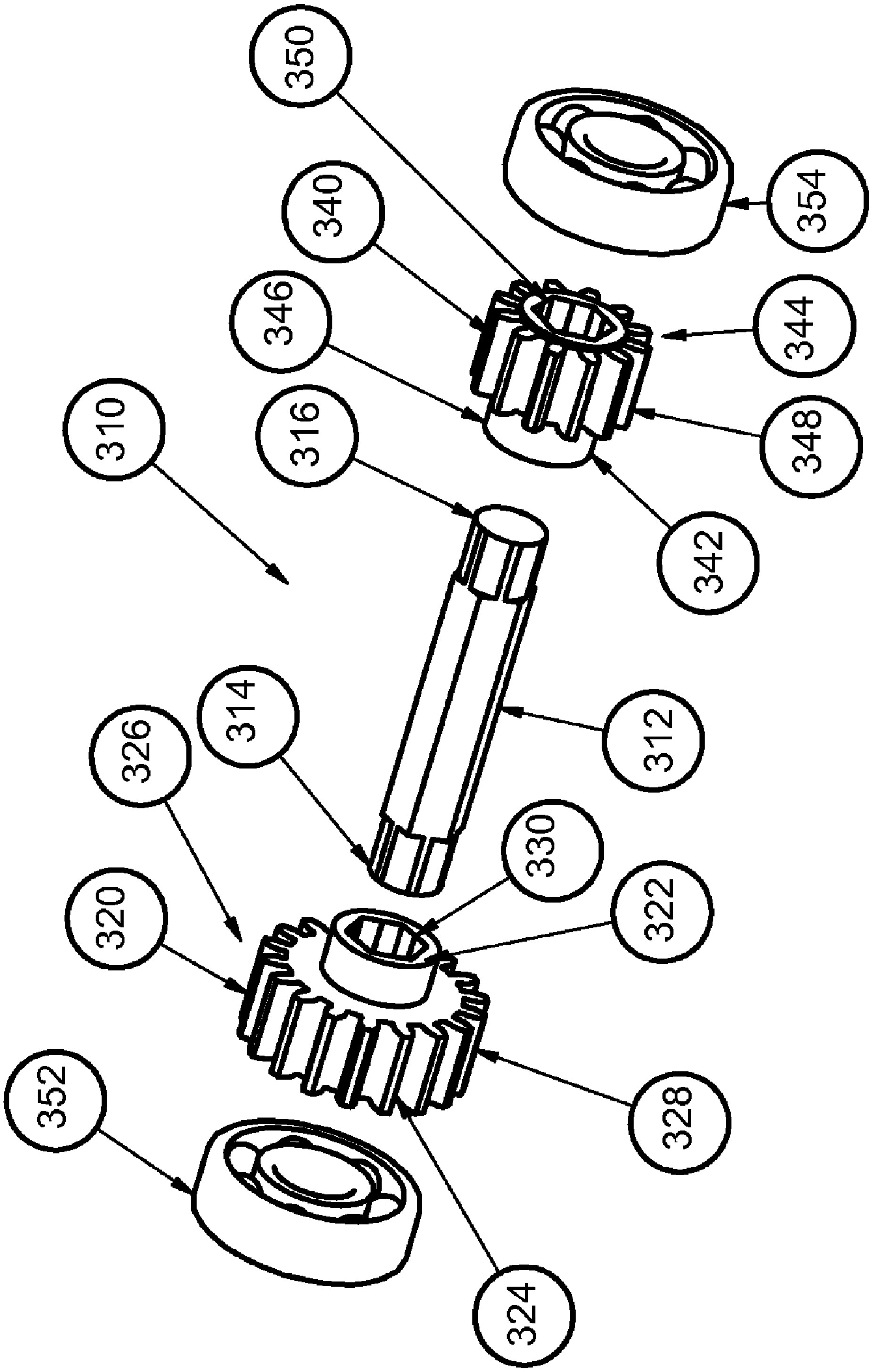
FIG. 13 shows an exploded view of a branch assembly.

With reference to FIG. 13 showing an exploded view of a branch assembly 310, the branch assembly 310 includes a branch shaft 312 defining a first end 314 and an oppositely disposed second end 316. The first and second ends 314, 316 are substantially identical and formed with a circumferential portion as illustrated. The main body of the branch shaft 312 is formed with an indexable geometry such as the illustrated hexagonal geometry as illustrated. The branch assembly 310 is provided with a first branch gear 320 defining a first end 322 and an oppositely disposed second end 324. The first branch gear 320 may be provided with a location shoulder 326 formed near the first end 322. The first branch gear 320 is provided with a plurality of gear teeth 328 located between the shoulder 326 and the second end 324. In one exemplary configuration, this first branch gear 320 is provided with 18 individual teeth of the plurality of teeth 328 and this first branch gear 320 is made of various materials. The first branch gear 320 may be provided with a hexagonal through hole 330 formed down the center extending between the first and second ends 322, 324. The branch assembly 310 is provided with a second branch gear 340 defining a first end 342 and an oppositely disposed second end 344. The second branch gear 340 may be provided with a location shoulder 346 formed near the first end 342. The second branch gear 340 is provided with a plurality of gear teeth 348 located between the shoulder 346 and the second end 344. In one exemplary configuration, this second branch gear 340 is provided with a 12 individual teeth of the plurality of teeth 348 and this second branch gear 340 is made of various materials. The second branch gear 340 may be provided with a hexagonal through hole 350 formed down the center extending between the first and second ends 342, 344. The branch assembly 310 is further provided with a first bearing 352 and a second bearing 354.

Figure 14:
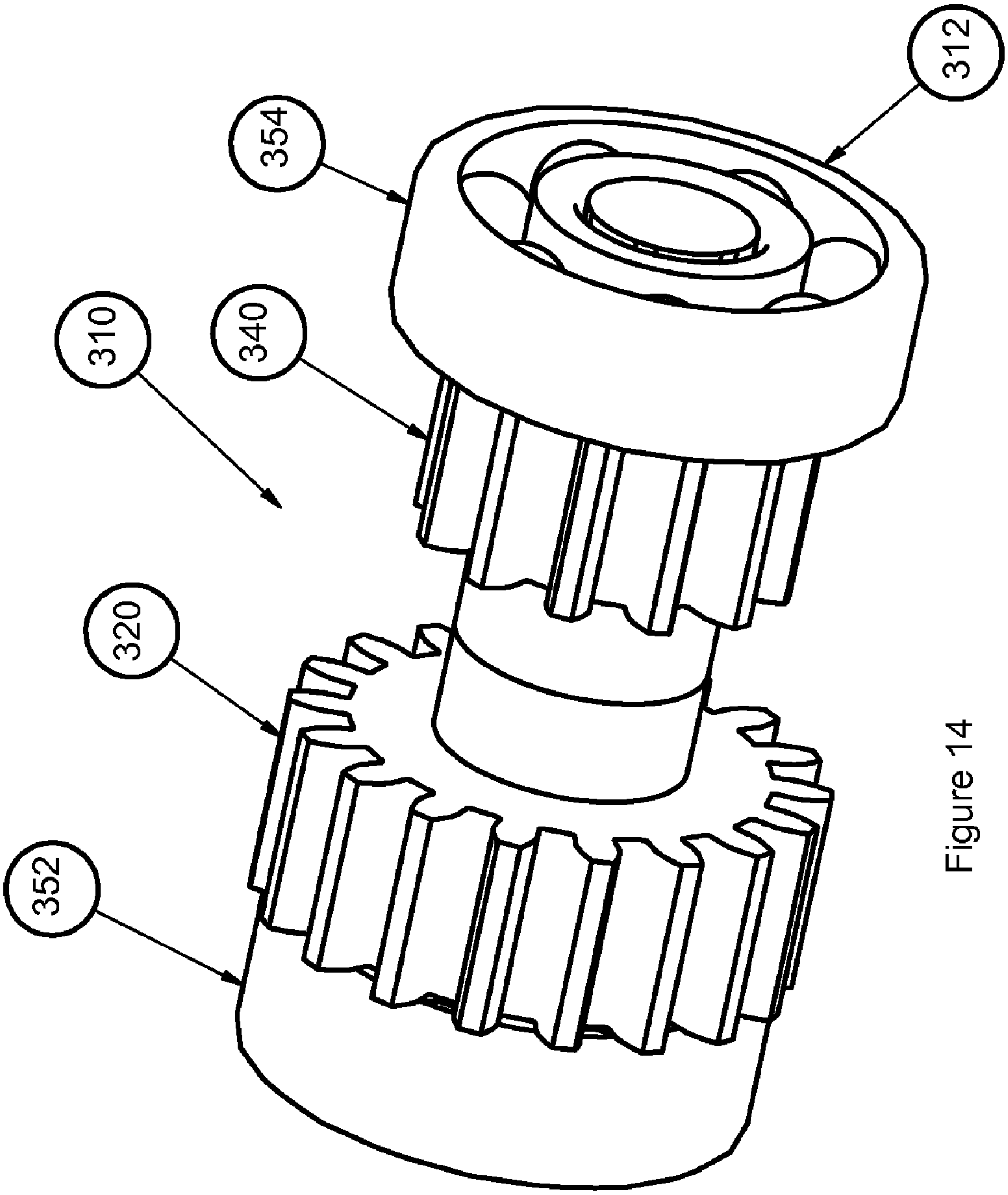
FIG. 14 shows an assembled branch assembly.

With reference to FIG. 14 showing an assembled branch assembly 310, once the individual components of the branch assembly 310 are unioned, the branch assembly looks as illustrated in FIG. 14 wherein the first and second branch gears 320, 340 are radially located by the branch shaft 312 and the first branch gear first face 322 contacts the second branch gear first face 342. The first and second bearings 352, 354 are positioned on the ends 314, 316 of the branch shaft 312, respectively.

Figure 15:
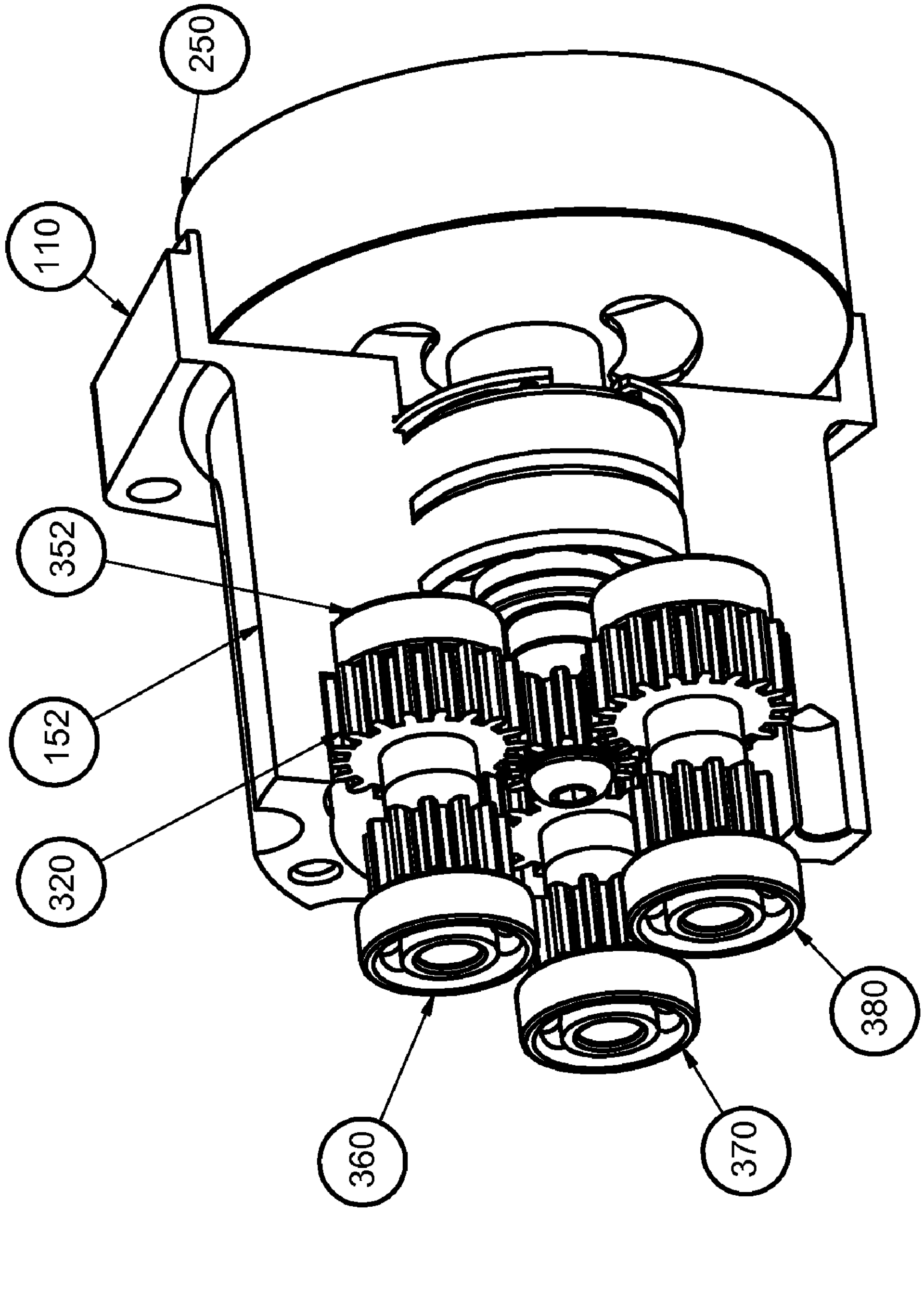
FIG. 15 shows a partial cutaway view of the base of FIG. 7 and a plurality of the branch assemblies of FIG. 13 of the inline transmission of FIG. 1.

With reference to FIG. 15 showing a portion of the inline transmission 100 with the base 110 having an illustrative cross-section taken therefrom, the inline transmission 100 is provided with a plurality of individual branch assembly 310 such as, for example, a first branch assembly 360, a second branch assembly 370, and a third branch assembly 380. It should be noted that the first, second and third branch assemblies 360, 370, 380 are identical to the branch assembly 310 and therefore, if required, reference numerals used to describe branch assembly 310 will be applied to the first, second and third branch assemblies 360, 370, 380. The first branch assembly 360 is unioned with the base 110 and the input assembly 250 by positioning the first branch assembly first gear 352 in the bearing support 152. This positioning of the first gear 352 in the bearing support 152 causes the first branch gear 320 to contact the input gear 270 in a manner that allows for power to be transferred from the input gear 270 to the first branch gear 320. In a similar manner, the second branch assembly 370 is unioned with the branch bearing support 156 (FIG. 8) and the third branch assembly 380 is unioned with the branch bearing support 154 (FIG. 8).

Figure 16:
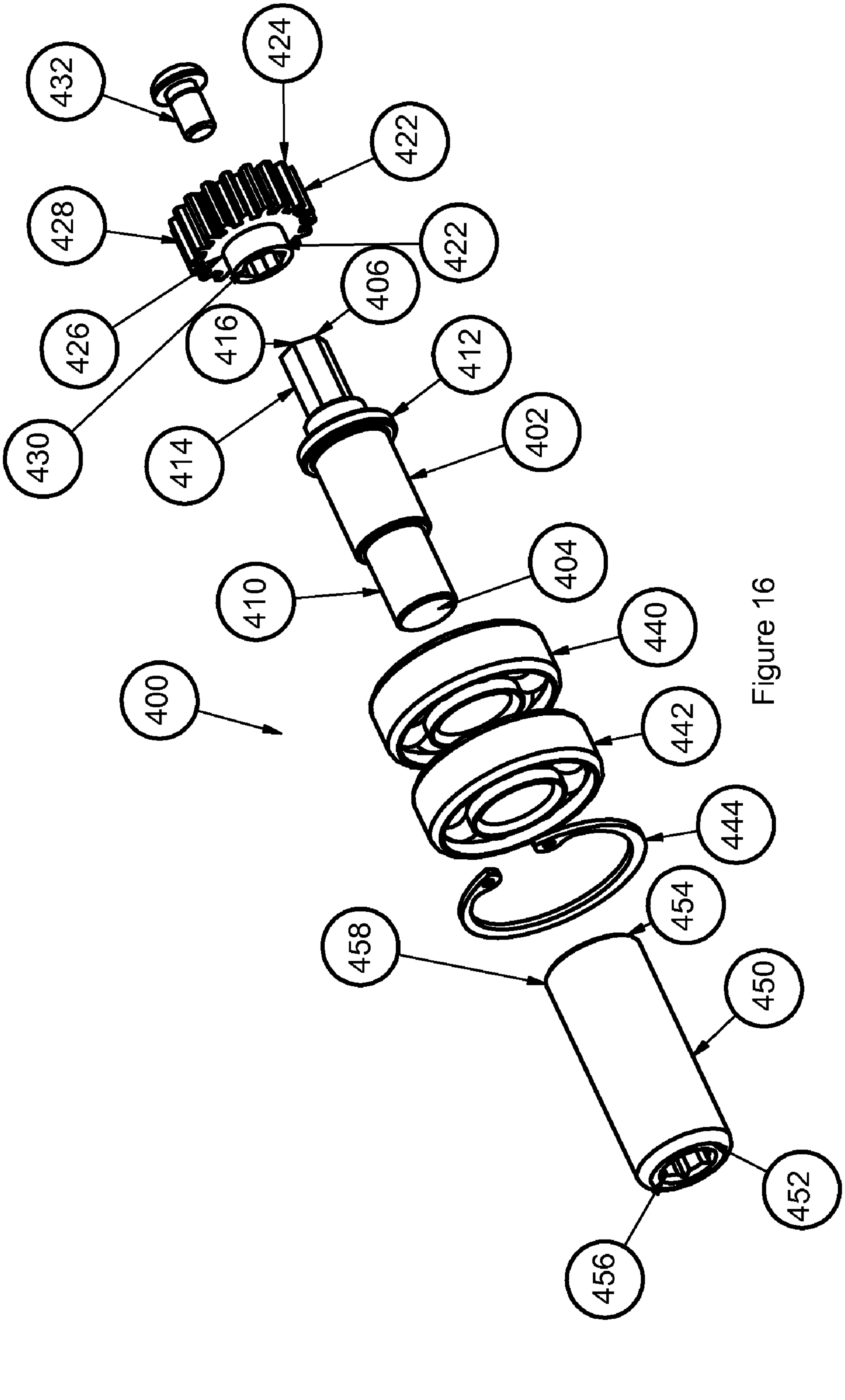
FIG. 16 shows an output assembly in an exploded condition.

With reference to FIG. 16 showing components of an output assembly 400 in an exploded condition, the output assembly 400 may be provided with an output shaft 402 defining a first end 404 and an oppositely disposed second end 406. The first end 404 a reduction 410. The center of the output shaft 402 has a collar 412 and the second end 406 has a hexagonal portion 414 formed thereon. The second end 406 has blind threaded hole 416. The output assembly 400 is also provided with an output gear 420 defining a first end 422 and an oppositely disposed second end 424. The output gear 400 may be provided with a location shoulder 426 formed near the first end 422. The output gear 420 is provided with a plurality of gear teeth 428 located between the shoulder 426 and the second end 424. In one exemplary configuration, this output gear 270 is provided with 18 individual teeth of the plurality of teeth 428 and this output gear 420 is made of various materials. The output gear 420 may be provided with a hexagonal through hole 430 formed down the center extending between the first and second ends 422, 424. The output assembly 420 is further provided with a button head screw 432 having a threaded body that matches the diameter and pitch of the blind threaded hole 416 of the output shaft 402. The output gear 420 is fixedly attached to the output shaft 402 by the button head screw 432. This assemblage of the output gear 420 onto the output shaft 402 may be replaced by employing a powdered metal manufacturing process, hobbing the plurality of teeth 428 directly into the output shaft 402, or other manufacturing processes commonly used to reduce part count.

Figure 17:
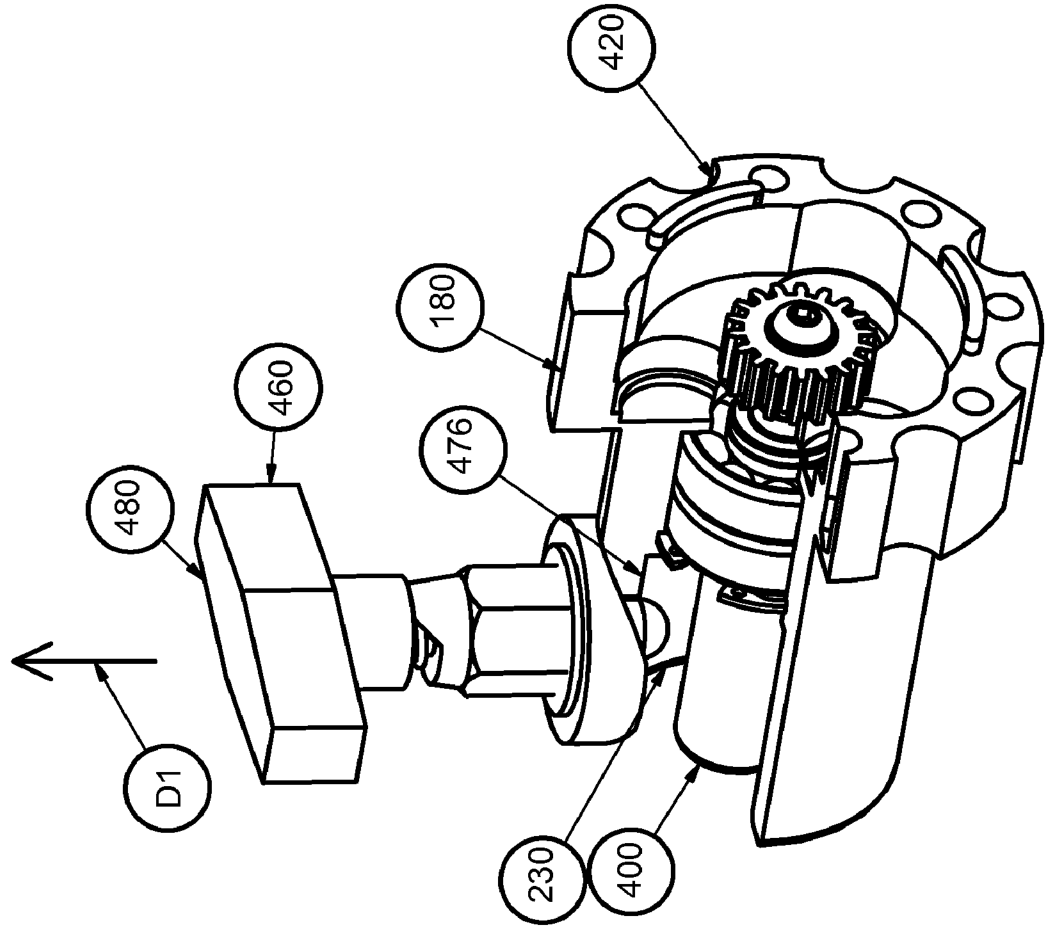
FIG. 17 shows a partial cutaway view of the cap of FIG. 9, the output assembly of FIG. 16 and the release mechanism of FIG. 17 of the inline transmission of FIG. 1.
Figure 18:
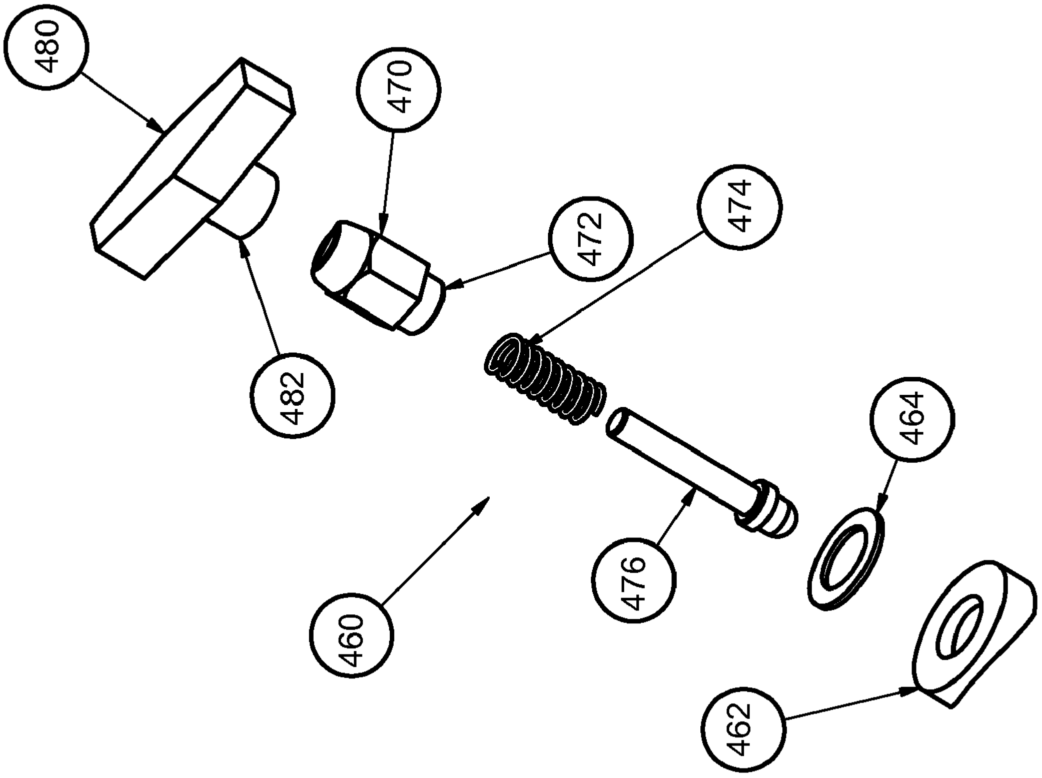
FIG. 18 shows a release mechanism in an exploded condition.

With continued reference to FIG. 16, the output assembly 400 may be provided with a pair of bearings including a first bearing 440 and a second bearing 442. These bearings 440, 442 are positioned on the output shaft 402 such that the first bearing 440 contacts the collar 412 and the second bearing 442 contacts the first bearing 440. The output assembly 400 is also provided with an internal snap ring 444 that is only provided with the output assembly 400 and not actually engaged with anything until it is positioned and engaged with the groove 236 (FIG. 10) of the cap 180 (FIG. 10). The output assembly 400 is also provided with a union sleeve 450 defining a first end 452 and an oppositely disposed second end 454. The first end 452 is formed with a splined hole 456 and the second end 454 is formed with a hole 458. Once assembled, the hole 458 of the union sleeve 450 is attached to the reduction 410 of the output shaft 402. Once the output assembly 400 is assembled with the various components, it is engaged with the cap 180 as illustrated in FIG. 17 showing a cross-sectioned view of the cap 180 and output assembly 400. It is important to note that the order of assembling the cap 180 and the output assembly 400 may be made out of order; for example, the output gear 420 may be installed on the output shaft 402 (FIG. 16) after the output assembly 400 is substantially unioned with the cap 180.

With reference to FIG. 17 showing a cross-sectioned view of the cap 180 and output assembly 400, the inline transmission 100 may be provided with a release mechanism 460. This release mechanism 460 serves to readily removably attach the elongated tubular member 22 (FIG. 1) at its first distal end 24 (FIG. 1). The release mechanism 460 will be provided in greater detail by an exploded illustration.

With reference to FIG. 28 showing the release mechanism 460 in an exploded condition, the release mechanism 460 is provided with a union washer 462 serving to interface the release mechanism 460 to the cap 180 (FIG. 17). Adjacent to the union washer is a flat washer 464. The release mechanism 460 is further provided with a spring cap 470 having a cupped hole 472 formed in one end thereof. A spring 474 and a plunger 476 are captured between the spring cap 470 and the union washer 462. The last component in this exemplary embodiment that is provided with the release mechanism is a handle 480 having a hole 482 formed in the bottom thereof. The hole 482 of the handle 480 is attached to the plunger 476. Once the release mechanism 460 is completely assembled and attached to the cap 180 as shown in FIG. 17, the handle can be pulled in a release direction D1 to cause the plunger 476 to move out of the clearance hole 230 formed in the cap 180.

Figure 19:
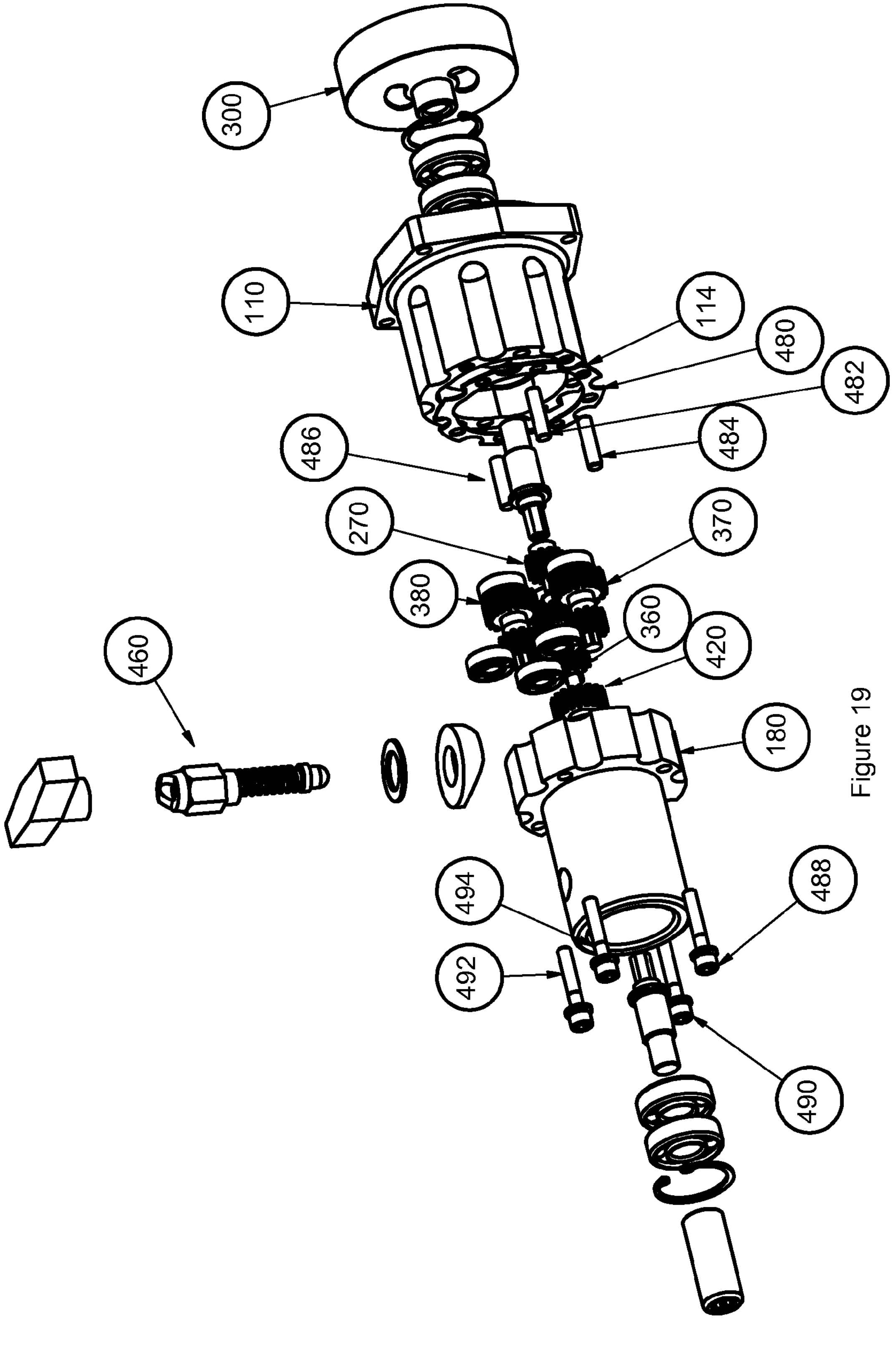
FIG. 19 shows an exploded view of the individual components of one exemplary embodiment of the inline transmission of FIG. 1.
Figure 20:
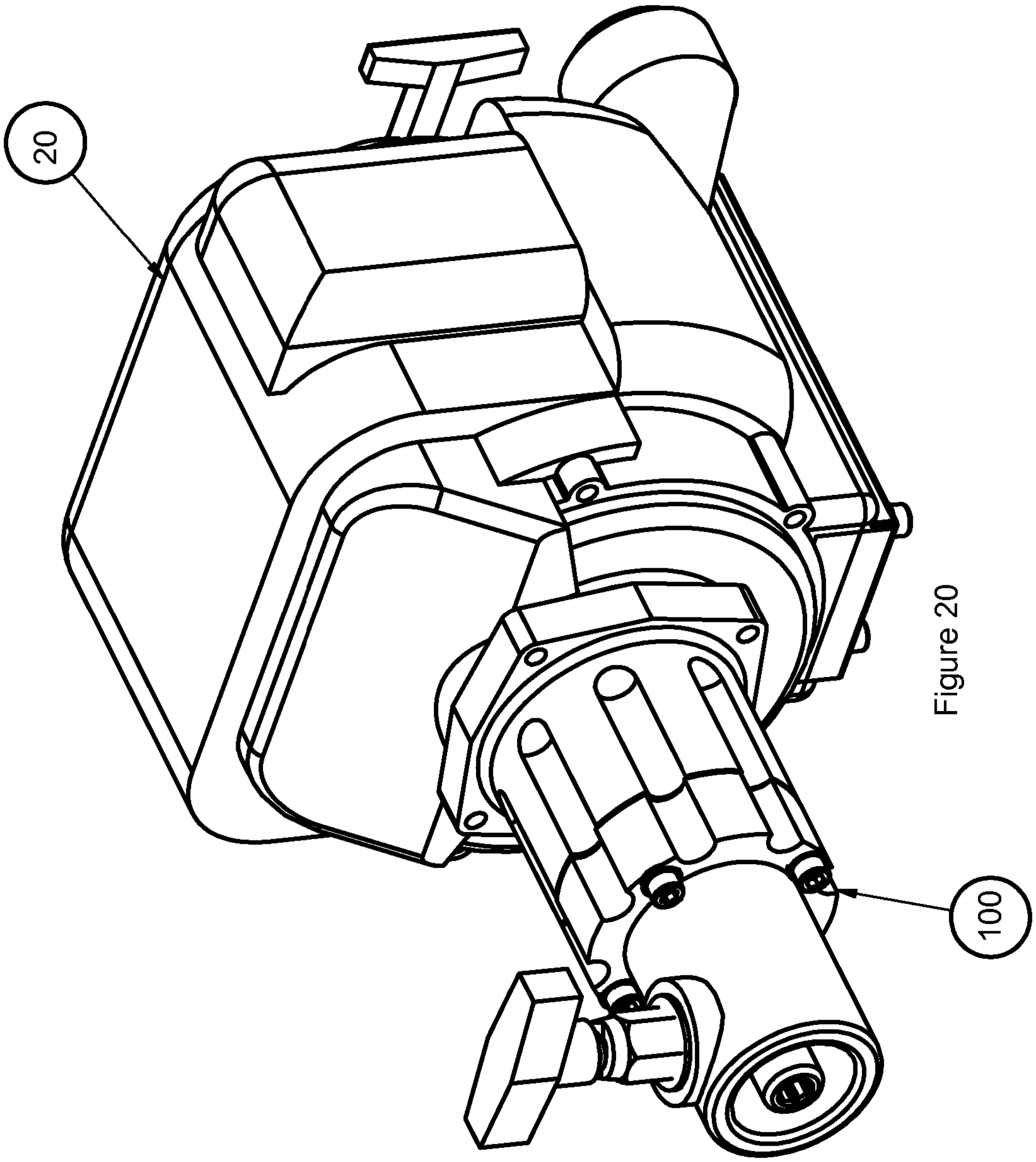
FIG. 20 shows an isometric view of the inline transmission attached to an exemplary engine.

Having provided descriptions of various components and subassemblies of the inline transmission 100, an overall assembly process of the inline transmission 100 will be described as illustrated in an exploded view. With reference to FIG. 19 showing the inline transmission 100 in an exploded condition, the inline transmission 100 is shown in an idealized manner. There are other exploding steps to cause various versions of subassemblies during the process of completed in the final assembled inline transmission 100. Components of the inline transmission 100 yet to be described include: a gasket 480, a plurality of locating pins 482, 484, 486 and a plurality of bolts 488, 490, 492, 494. Once the assembly of the base 110, the input assembly 250 and the first, second and third branch assemblies 360, 370, 380 as illustrated in FIG. 15 occurs, the gasket 480 is placed into contact with the second end 114 of the base 110 and the locating pins 482, 484, 486 are put into the locator pin holes 168, 170, 172 (FIG. 8). The next assembly step is to attach the cap 180, the output assembly 400 and the release mechanism 460 as illustrated in FIG. 17 to the base 110. In attaching the cap 180, the locator pin holes 208, 210, 212 (FIG. 9) in the cap 180 are interfaced with the locating pins 482, 484, 486. As a final assembly step, the bolts 488, 490, 492, 494 are positioned in the through holes 200, 202, 204, 206 (FIG. 9) formed in the cap and ultimately threaded into the threaded holes 160, 162, 164, 166 (FIG. 8). Having attached the components of the inline transmission 100, it can be attached to the primary power source 20 as illustrated in FIG. 20. With reference to FIG. 20 showing an isometric perspective of a primary power source 20 with an inline transmission 100 attached thereto, the base first end 112 of the inline transmission 100 is placed into contact with corresponding features formed in the primary power source 20. In placing the inline transmission 100 against the primary power source 20, the mounting holes 120 (FIG. 6), 122 (FIG. 7), 124 (FIG. 6), 126 (FIG. 6) of the base 110 are aligned to and ultimately utilized by bolts (not shown) to treadingly attach the inline transmission 100 to the primary power source 20. After attaching the inline transmission 100 to the primary power source 20, the various components of the concrete vibrator 10 illustrated in FIG. 1 are attached to the inline transmission 100.

Having described components, subassemblies and final assembly of one exemplary embodiment of the present inline transmission 100 for the concrete vibrator 10, the method of using the same will now be provided. With reference to FIG. 1 showing an isometric perspective of the portable concrete vibrator system 10, the user pulls on a starter rope with a handle to start the primary power source 20. Once the primary power source 20 is started and running, the remote finishing tool 50 is placed into fresh concrete and the user operates the trigger handle 28 to cause the primary power source 20 to generate power in the form of rotary energy. This rotary energy is transferred to the remote finishing tool 50 via the inline transmission 100, the elongated tubular member 22 and the flexible tubular member 40. As the remote finishing tool 50 operates in the mariner for which it is intended, it vibrates and transfers the energy to the concrete causing entrapped air and excess water are released from the concrete.

With respect to the above description then, it is to be realized that the optimum dimensional relationships for the parts of the concrete vibrator inline transmission, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the concrete vibrator inline transmission.

Directional terms such as "front", "back", "top", "bottom", "left", "right", "interior", and the like may have been used in the description. These terms are applicable to the embodiments shown and described in conjunction with the drawings. These terms are merely used for the purpose of description in connection with the drawings and do not necessarily apply to the position in which the concrete vibrator inline transmission may be used.

Therefore, the foregoing is considered as illustrative only of the principles of the concrete vibrator inline transmission. Further, since numerous modifications and changes will readily occur to those skilled in the art, it is not desired to limit the concrete vibrator inline transmission to the exact construction and operation shown and described, and accordingly, all suitable modifications and equivalents may be resorted to, falling within the scope of the concrete vibrator inline transmission.

What is claimed is:

1. A concrete vibrator inline transmission comprising:

a base;

a base bearing support formed in said base and defining an input axis;

an input shaft positioned in said base bearing support and coaxial to said input axis;

an input gear fixedly interfaced with said input shaft and coaxial to said input axis;

a cap fixedly attached to said base;

a cap bearing support formed in said cap and defining an output axis;

wherein said input axis and said output axis are coaxial;

an output shaft positioned in said cap bearing support and coaxial to said output axis;

an output gear fixedly interfaced with said output shaft and coaxial to said output axis; and a branch transmission gearingly disposed engaged to said input gear and said output gear;

a first branch axis defined by said branch transmission, wherein said first branch axis is parallel to said input axis and said coaxial output axis, and wherein said first branch axis is offset from said input axis and said coaxial output axis;

a first branch shaft coaxial to said first branch axis;

a first branch gear fixedly interfaced with said first branch shaft; and a second branch gear fixedly interfaced with said first branch shaft;

wherein said first branch gear is drivingly engaged to said input gear, and wherein said second branch gear is drivingly engaged to said output gear.

2. The concrete vibrator inline transmission of claim 1 and further comprising;

a plurality of flats formed in said first branch shaft; and a plurality of flats matching said first branch shaft plurality of flats formed in a through hole in said first branch gear.

3. The concrete vibrator inline transmission of claim 2 wherein said plurality of flats formed in said branch shaft and said first branch gear comprises six sides.

4. The concrete vibrator inline transmission of claim 1 and further comprising:

a branch circle defining a center;

wherein said branch circle center is located on said input axis and said coaxial output axis;

wherein said first branch axis is located on said branch circle;

a second branch shaft defining a second branch axis;

wherein said second branch axis is parallel to said input axis and said coaxial output axis; and wherein said second branch axis is located on said branch circle.

5. The concrete vibrator inline transmission of claim 1 and further comprising:

a first number of teeth formed on said first branch gear;

a second number of teeth formed on said second branch gear; and wherein said first number of teeth is greater than said second number of teeth.

6. The concrete vibrator inline transmission of claim 1 and further comprising:

a number of input teeth formed on said input gear;

a number of output teeth formed on said output gear; and wherein said number of input teeth is less than said number of output teeth.

7. The concrete vibrator inline transmission of claim 1 and further comprising:

a release mechanism attached to said cap.

8. The concrete vibrator inline transmission of claim 7 and further comprising;

a release pin defining a release axis; and wherein said release axis is transverse to said input axis and said coaxial output axis.

* * * * *